(12) United States Patent
Kerwin

(10) Patent No.: US 6,343,027 B1
(45) Date of Patent: Jan. 29, 2002

(54) TRANSFORMERLESS HIGH VOLTAGE INVERTER USING A FOURTH-ORDER IMPEDANCE NETWORK

(75) Inventor: William J. Kerwin, Tucson, AZ (US)

(73) Assignee: Durel Corporation, Chandler, AZ (US)

(*) Notice: Subject to any disclaimer, the term of this patent is extended or adjusted under 35 U.S.C. 154(b) by 0 days.

(21) Appl. No.: 09/792,508

(22) Filed: Feb. 23, 2001

(51) Int. Cl.⁷ .................................................. H02M 7/44
(52) U.S. Cl. ...................... 363/95; 363/131; 331/117 R; 331/167
(58) Field of Search ............................ 331/117 R, 167; 363/95, 97, 131

(56) References Cited

U.S. PATENT DOCUMENTS 5,457,434 A  10/1995  Partow .................. 331/117 FE
5,587,629 A  12/1996  Gornstein ............... 315/200 R

OTHER PUBLICATIONS

Radio Amateur's Handbook, American Radio Relay League, Inc. Dec. 1958, p. 226.

*Primary Examiner*—Jeffrey Sterrett
(74) *Attorney, Agent, or Firm*—Paul F. Wille

(57) ABSTRACT

An inverter includes a fourth order impedance network coupled between the output and the input of an amplifier, causing the inverter to oscillate and produce a high voltage at an output of the impedance network. The impedance of one portion of the impedance network is preferably at least ten times the impedance of a second portion of the impedance network at the frequency of oscillation.

11 Claims, 2 Drawing Sheets

TRANSFORMERLESS HIGH VOLTAGE INVERTER USING A FOURTH-ORDER IMPEDANCE NETWORK

BACKGROUND OF THE INVENTION

This invention relates to an inverter for converting direct current to alternating current and, in particular, to a high voltage inverter that uses resonance effects to achieve a large voltage gain.

In portable electronic devices, instrument panels in vehicles, and other applications where the power source is a low voltage battery, a cold cathode fluorescent lamp is driven by an inverter that converts low voltage direct current into high voltage alternating current. In order for a cold cathode fluorescent lamp to glow sufficiently, a peak-to-peak voltage in excess of about one thousand volts is necessary. As known to those of skill in the art, the actual voltage depends on the construction of the lamp and, in particular, the length and diameter of the lamp.

The available DC voltage limits the voltage that can be produced by an inverter. Converting from six volts or less to one thousand volts or more is difficult without a transformer. A problem with a transformer is that a transformer must be custom wound for each circuit. This increases the cost of the circuit and makes it difficult to modify the circuit without requiring a new transformer design.

To increase the output voltage without a transformer, the prior art teaches using what is known as a "flyback" inverter in which the energy stored in an inductor is supplied to a storage capacitor as a small current at high voltage. Ignoring the resistance of the wire, the voltage across an inductor is proportional to $L \cdot \delta_i / \delta_t$. By abruptly turning off the current through an inductor, a low voltage at high current is converted into a high voltage at low current.

It is also known in the art that high voltages can be generated in resonant circuits. For example, U.S. Pat. No. 5,587,629 (Gornstein), discloses a power supply for a photoflash. The power supply includes one half of a twin-T filter in the feedback path of an amplifier. The output is taken across the stem of the T.

A problem with the Gornstein circuit is the unrealizable Q of the components, particularly the inductor. A Q of 200 to 400 is attainable in an inductor only by careful construction on expensive cores. What is desired is a resonant inverter that can use components having standard values rather than using custom designed components. Standard components greatly reduce the cost of the inverter but have the disadvantage of requiring that the circuit be tolerant of variations in component values.

The Gornstein circuit stores pulses of rectified AC on a capacitor for discharge through a flash lamp. What is desired is a circuit capable of providing continuous current through a cold cathode fluorescent lamp. Such circuits typically include a transformer, which adds significantly to the cost and bulk of the circuit. Each application, i.e. each lamp, typically requires a different transformer, which makes the circuit expensive to design and manufacture. A transformer is necessary because the starting voltage of a cold cathode fluorescent lamp is typically at least twice as high as the operating voltage of the lamp. Commercially available inverters for cold cathode fluorescent lamps produce 70–1500 volts rms.

In view of the foregoing, it is therefore an object of the invention to provide an inverter for converting low voltage direct current into high voltage alternating current without high voltage switching transistors.

Another object of the invention to eliminate the transformer from an inverter for cold cathode fluorescent lamps.

A further object of the invention is to provide an inverter using resonance effects to convert a voltage of 12 volts DC or less into a voltage of 500 volts rms AC or more.

Another object of the invention is to provide an inverter using a high voltage oscillator constructed from standard components.

SUMMARY OF THE INVENTION

The foregoing objects are achieved by this invention in which the inverter includes a fourth order impedance network coupled between the output and the input of an amplifier, causing the amplifier to oscillate and produce a high voltage at an output of the impedance network. The impedance of the output portion of the impedance network is preferably at least ten times the impedance of the input portion of the impedance network at the frequency of oscillation.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
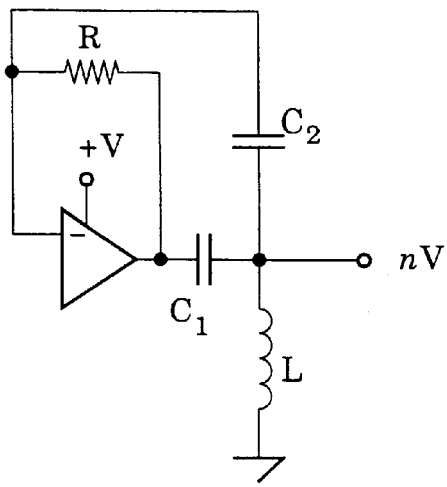
FIG. 1 is a schematic of a high voltage generator known in the art.

FIG. 1 is a schematic, slightly re-arranged, of the high voltage oscillator disclosed in U.S. Pat. No. 5,587,629 (Gornstein). It is disclosed that the resonant frequency is given by the following equation.

$$\omega = 1/\sqrt{L \cdot (C_1 + C_2)}$$

Capacitors $C_1$ and $C_2$ have the same value. It is alleged that, at 100 kHz, the circuit produces 696 VAC from a nine volt input but the circuit requires an inductor having a Q of 400, which is difficult to obtain. Capacitor $C_2$ and resistor R provide voltage feedback from two points in the circuit and are coupled to the inverting input of the operational amplifier. The LC circuit in FIG. 1 is a second order impedance network.

Figure 2:
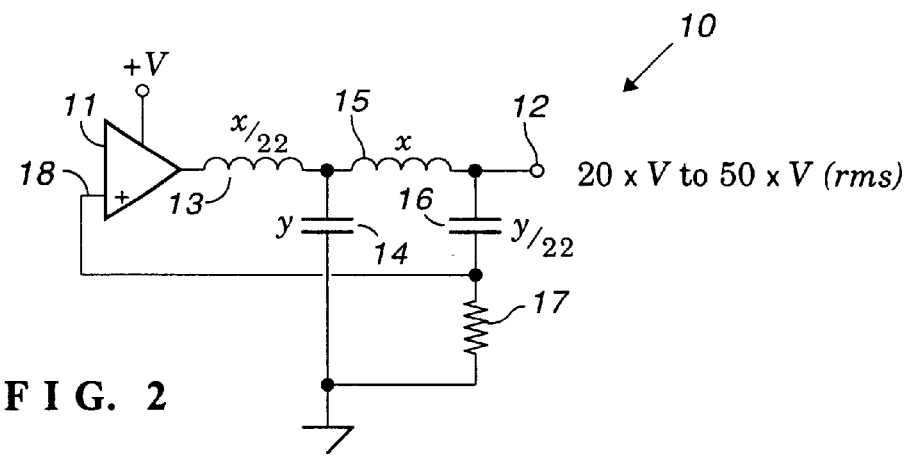
FIG. 2 is a partial schematic illustrating the operating parameters of an inverter constructed in accordance with the invention.

In FIG. 2, the output of amplifier 11 is coupled through a fourth order impedance network to output 12. The impedance network includes inductor 13 in series with capacitor 14 and inductor 15 in series with capacitor 16. Inductor 15 is coupled to the junction of inductor 13 and capacitor 14. Output 12 is coupled to the junction of inductor 15 and capacitor 16. Thus configured, there is an input LC circuit (13, 14) and an output LC circuit (15, 16) together forming a fourth order impedance network. A feedback path couples the network between the output of amplifier 11 and an input of the amplifier.

Resistor 17 has a small resistance and is coupled in series with capacitor 16 between output 12 and ground. Resistor 17 provides a feedback voltage that is proportional to the current through capacitor 16. The feedback voltage is coupled to non-inverting input 18 of amplifier 11. For oscillation to occur, the total phase shift of the output signal from amplifier 11 has to be substantially equal to 360°. This provides a substantial advantage to the invention in that the circuit seeks the frequency at which a phase shift of 360° occurs, i.e. variations in component value are of little consequence because the frequency of operation shifts slightly with no loss of gain. Thus, precision components are not necessary and the circuit is relatively inexpensive to implement.

When power (+V) is applied to inverter 10, the circuit oscillates at a frequency such that the phase shifts across the impedance network total substantially 360°. The voltage at output 12 is typically twenty to one hundred times the magnitude of supply voltage (+V), even under load, i.e. when driving a cold cathode fluorescent lamp. The output voltage is essentially sinusoidal alternating current.

In a simulation, the unloaded output voltage was 1500 volts peak to peak with a supply voltage of 10 volts and was 900 volts peak to peak with an operating cold cathode fluorescent lamp connected to output 12. The impedance of inductor 13 and capacitor 14 at resonance is at least ten times and, preferably, about twenty times, the impedance of inductor 15 and capacitor 15 at resonance. This is indicated in FIG. 2 by the x and y values adjacent the components. In one embodiment of the invention, the following component values were used. The values are for example only.

| | |
|---|---|
| Inductor 13 | 680 $\mu$H |
| capacitor 14 | 15 nf |
| Inductor 15 | 15 mH |
| capacitor 16 | 680 pf |
| Resistor 17 | 15 $\Omega$ |

Using the above values, inverter 10 oscillated at approximately 45 kHz., which is slightly less than the resonant frequency of either LC circuit alone, calculated using the values given above. The decrease in frequency is due to interaction between the components of the impedance network. The lower frequency is actually one of two maxima at which the circuit can be made to operate. The other frequency at which maximum gain occurs is above the calculated resonant frequency. The lower frequency maximum is the "natural" operating point of the inverter and is obtained by simply applying power. The circuit can be driven at the upper frequency with good voltage gain, which decreases slightly between the maxima and decreases sharply outside the maxima.

Figure 3:
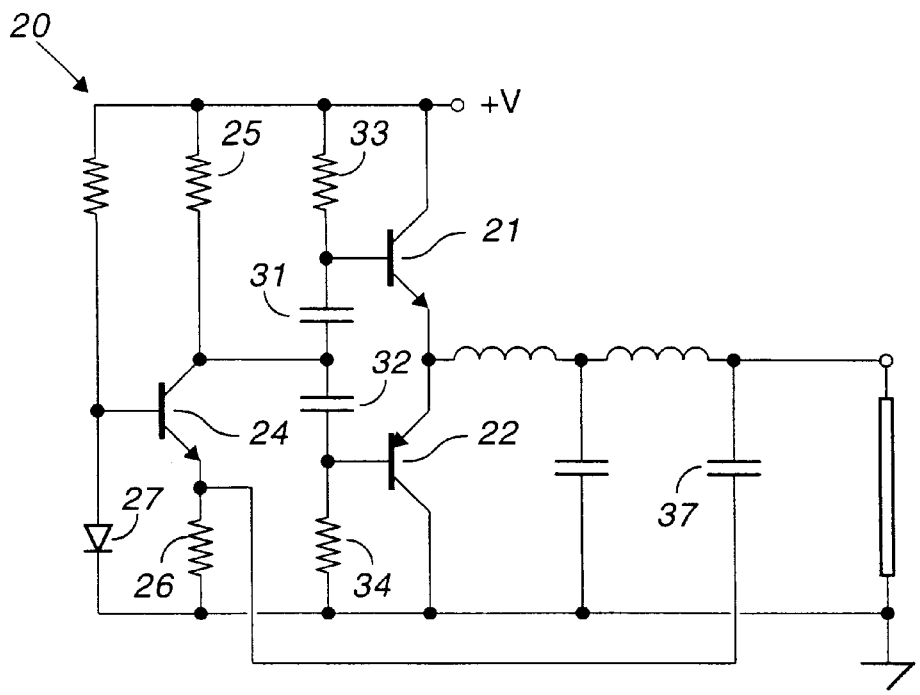
FIG. 3 is a schematic of an inverter constructed in accordance with the invention.

FIG. 3 is an example of an amplifier stage using discrete semiconductor components to make an inverter in accordance with the invention. Amplifier includes transistors 21 and 22 operating in push-pull as emitter followers driven by transistor 24. The output from transistor 24 is taken from the junction of the collector of transistor 24 and load resistor 25. Resistor 26, coupled between the emitter of transistor 24 and ground provides a low impedance, non-inverting input to amplifier 20. Diode 27 clamps the base of transistor 24 to approximately 0.6 volts above common.

When power (+V) is applied to the circuit, transistor 24 becomes forward biased and turns on. At the same time, capacitors 31 and 32 charge through series resistors 33 and 34. The base-emitter junction of transistor 21 becomes forward biased and transistor 21 conducts, bringing the junction of transistors 21 and 22 positive. At some point, transistor 24 conducts sufficiently to turn off transistor 21 and turn on transistor 22, bringing the emitters of transistors 21 and 22 to ground potential. The resulting square wave is filtered by the impedance network and a portion of the output is coupled to the emitter of transistor 24, providing positive feedback. The circuit oscillates at a frequency determined by the impedance network, as described in conjunction with FIG. 2. The output signal is a sinusoidal, AC voltage many times the magnitude of the supply voltage.

Figure 4:
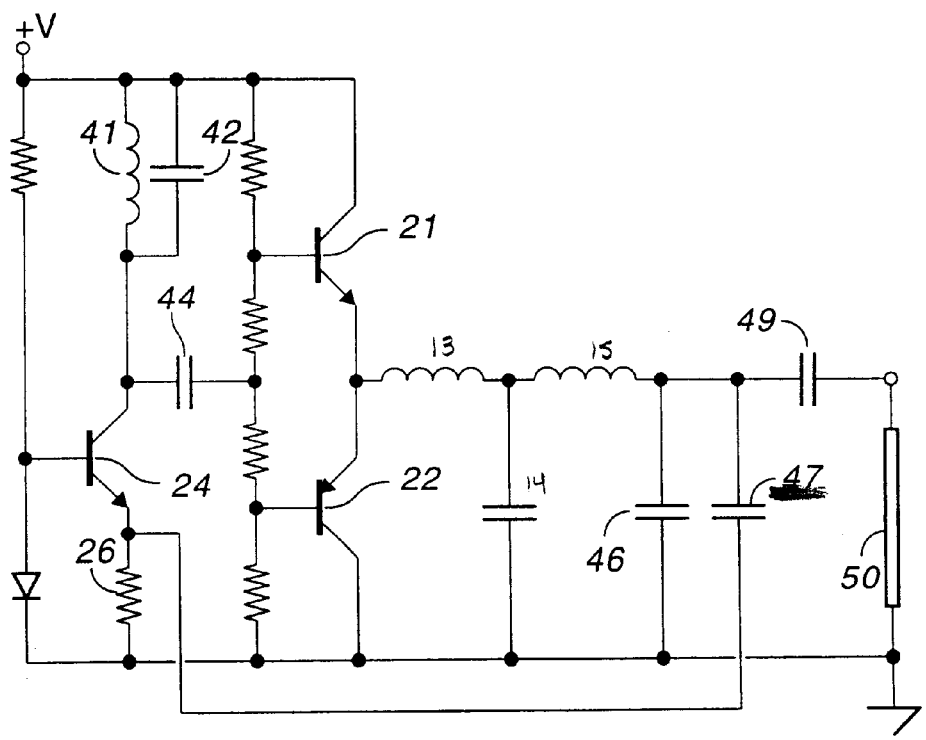
FIG. 4 is a schematic of an inverter constructed in accordance with a preferred embodiment of the invention.

FIG. 4 is a schematic of a preferred embodiment of the invention. Comparing FIG. 4 to FIG. 3, a parallel resonant LC circuit has been substituted for resistor 25. The parallel resonant LC circuit is tuned to the actual frequency of oscillation and improves the efficiency and stability of the inverter. A second difference is in the base drive circuit, wherein resistors are substituted for capacitors 31 and 32 and capacitor 44 is added to prevent DC coupling. This change improves the switching of transistors 21 and 22.

A third difference is that two capacitors have been substituted for capacitor 37 (FIG. 3). The sum of the capacitances of capacitors 46 and 47 (FIG. 4) is approximately the same as the capacitance of capacitor 37. The difference is that capacitor 46 is returned to common, whereas capacitor 47 is returned to resistor 26. The change reduces the amount of positive feedback but also reduces the load on the tuned circuits, increasing the Q of the circuits. The reduced positive feedback does not reduce output voltage because the gain of transistor 24 (FIG. 3) is more than enough to compensate. By way of example, capacitor 46 had a capacitance of 630 pf and capacitor 47 had a capacitance of 50 pf.

A fourth difference is the addition of capacitor 49 in series with cold cathode fluorescent lamp 50. The Q of the circuit is increased because the impedance of the load is increased by adding capacitor 49. Lamp 50 actually brightens slightly when capacitor 49 is added.

For the circuit shown in either FIG. 3 or FIG. 4, gain increases as L2/L1 increases; power increases as L2/L1 increases; efficiency is independent of L2/L1; and efficiency increases as L2 increases. L1 is the inductance of inductor 13 and L2 is the inductance of inductor 15. The circuit provides the optimum combination of gain, power, and efficiency, which are relatively easily increased individually but difficult to improve simultaneously.

Figure 5:
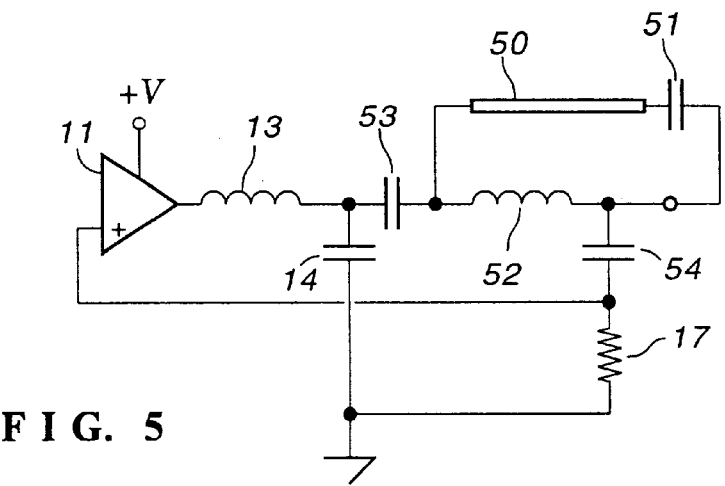
FIG. 5 is a schematic of an inverter constructed in accordance with an alternative embodiment of the invention.

The locations of the inductors and capacitors in the impedance network can be separately interchanged; i.e. inductor 13 and capacitor 14 can be interchanged with or without interchanging inductor 15 and capacitor 16 and vice-versa. FIG. 5 is a schematic of an alternative embodiment of the invention wherein the output is taken across the second inductor and neither end of lamp 50 has a resistive path to common. Resonant capacitors 53 and 54 are equal and see only half the voltage that capacitor 16 (FIG. 2) sees. This configuration provides a differential output to the lamp that reduces parasitic losses through the capacitance of the lamp leads. Capacitor 51 is a ballast capacitor, corresponding to capacitor 49 in FIG. 4.

The invention thus provides an inverter for converting low voltage direct current into high voltage alternating current without high voltage switching transistors and without a transformer. The inverter uses resonance effects to convert a voltage of 12 volts DC or less into a voltage of more than 500 volts rms AC and, typically, more than 750 volts rms.

Having thus described the invention, it will be apparent to those of skill in the art that various modifications can be made within the scope of the invention. For example, two inductors connected in series can be used instead of a single inductor to reduce the voltage across an inductor. Either capacitor 53 or capacitor 54 can be eliminated from the circuit illustrated in FIG. 5, with appropriate change in value for the remaining capacitor. An operational amplifier can be used instead of discrete components if the operational amplifier can handle 100 milliamperes or more current.

What is claimed as the invention is:

1. A low power, high voltage, transformerless inverter using resonance effects to convert a low voltage of 12 volts DC or less into a high voltage greater than 500 volts rms AC, said inverter comprising:

an amplifier powered by said low voltage and having an output and an input;

a fourth order impedance network coupling said output to said input.

2. The inverter as set forth in claim 1 and further including a feedback resistor coupled to said impedance network for converting at least a portion of a current in the impedance network into a voltage;

said feedback resistor also being coupled to the input of said amplifier for causing the inverter to oscillate, thereby producing a high voltage from said impedance network.

3. The inverter as set forth in claim 2 wherein the fourth order impedance network includes:

a first inductor and a first capacitor connected in series and having a first junction there between;

a second inductor and a second capacitor connected in series and having a second junction there between;

wherein the second inductor is coupled to said first junction.

4. The inverter as set forth in claim 3 and further including a third capacitor, wherein the third capacitor is coupled between said second junction and said feedback resistor.

5. The inverter as set forth in claim 4 wherein the second capacitor has a larger capacitance than the third capacitor.

6. An inverter for driving a cold cathode fluorescent lamp from a DC supply, said inverter comprising:

an amplifier powered by said DC supply and having an output and an input;

a series coupled first inductor and a first capacitor coupled to said output and having a first junction there between;

a series coupled second inductor and a second capacitor coupled to said first junction and having a second junction there between;

a feedback resistor coupled to said second capacitor for converting current into a feedback voltage;

said feedback resistor also being coupled to the input of said amplifier;

wherein said second junction is adapted to be coupled to said cold cathode fluorescent lamp.

7. The inverter as set forth in claim 6 and further including a third capacitor, wherein the third capacitor is coupled between said second junction and said feedback resistor.

8. The inverter as set forth in claim 7 wherein the second capacitor has a larger capacitance than the third capacitor.

9. A transformerless inverter for driving a cold cathode fluorescent lamp from a DC supply, said inverter comprising:

an amplifier powered by said DC supply and having an output and an input;

a fourth order impedance network connected to the output of the amplifier;

wherein the output of the inverter is taken across the fourth component of the impedance network.

10. The inverter as set forth in claim 9 and further including:

a feedback resistor coupled to the impedance network for converting at least a portion of a current in the impedance network into a voltage;

wherein the feedback resistor is also coupled to an input of the amplifier for causing the inverter to oscillate, thereby producing a high voltage at the output of the inverter.

11. The inverter as set forth in claim 10 wherein the impedance network includes an input LC circuit and an output LC circuit wherein the impedance of the output LC circuit is at least ten times the impedance of the input LC circuit at the operating frequency of the inverter.

* * * * *